UNITED STATES PATENT OFFICE 2,251,459

PROCESS FOR THE MANUFACTURE OF MERCAPTOTHIAZOLINES

Roger A. Mathes, Akron, Ohio, assignor to The B. F. Goodrich Company, New York, N. Y., a corporation of New York No Drawing. Application August 9, 1939,
Serial No. 289,263

7 Claims. (Cl. 260—302)

This invention relates to an improved process for the manufacture of certain heterocyclic mercapto compounds and has particular reference to the preparation of mercaptothiazolines. These compounds are of value as accelerators for the vulcanization of rubber.

An object of the invention is to provide a process for the manufacture of mercaptothiazolines which is adapted to economical commercial production. A further object is to provide a simple, easily controlled process whereby mercaptothiazolines may be prepared in high yields.

These objects are attained by making use of a new technique when causing a halogen alkylamine, carbon disulfide and an alkali to read to form a mercaptothiazoline.

The following equation is illustrative of the reaction as it is believed to take place:

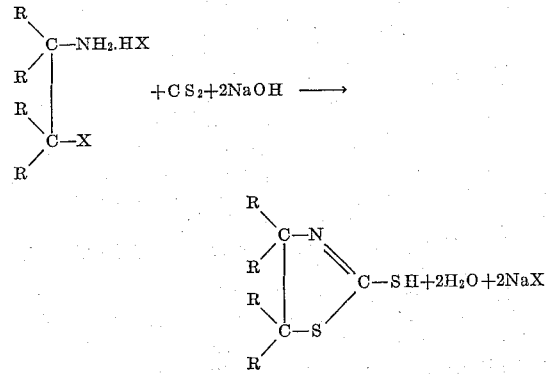

where X is a halogen as chlorine, bromine. R in each case represents like or unlike radicals which may be hydrogen or a hydrocarbon group such as alkyl, aryl, substituted aryl, etc., or two R's on different carbon atoms may even be joined together to form a ring.

Methods described in the literature for the preparation of mercaptothiazolines from a halogen alkylamine, carbon disulfide and caustic alkali provide for putting the reactants together all at one time. Under such conditions a violent, almost explosive reaction takes place which is impossible to control in other than very small laboratory apparatus. The reaction is not only exothermic but due to the sudden crystallization of the product, considerable heat of crystallization must be dissipated.

I have discovered a method whereby this reaction can be readily controlled and at the same time mercaptothiazolines of a high commercial purity can be produced in high yields. My new process consists of intermixing the reactants slowly, thereby allowing the reaction to proceed at as slow a rate as desired. By means of the slow, controlled addition rate of one of the reactants, the heat of reaction as well as the heat of crystallization are gradually dissipated, little or no cooling of the reaction mixture being necessary. I have furthermore discovered that results are not equally as satisfactory, when any one reactant is slowly added to the others. For example, the slow addition of carbon disulfide to an agitated water solution of a halogen alkylamine and an alkali does not give as satisfactory results as when the alkali or the halogen alkylamine are added slowly to the other reactants. The yield and quality of the product are materially improved when the process is carried out under definite conditions hereinafter disclosed. By my improved method, the reaction may be carried out safely on as large a scale as desired, a violent reaction being entirely eliminated. In addition, my process is adapted to a continuous method of manufacture as well as the ordinary batch process.

While sodium hydroxide is used in the illustrative equation, the use of caustic alkali is not necessary. Milder alkalis, as for example, sodium carbonate, aqueous ammonia, etc., may be used. Experimental results, however, indicate that caustic alkali is preferable.

Water is a very satisfactory reaction diluent. The mercapto bodies formed have a low water solubility and may be filtered off. The alkali metal or ammonium halide by-product is discarded along with the filtrate. An alcohol as methyl alcohol, ethyl alcohol, etc., may be used. The process is somewhat more involved when an alcohol is used by reason of the insolubility of the by-product inorganic salt and the partial solubility of the mercaptothiazoline.

Among the halogen alkyl amines that may be used in my process are 2-chloroethylamine and 2-bromoethylamine. 2-chloroethylamine hydrochloride may be readily prepared by treating ethanolamine hydrochloride with thionyl chloride. While reference is made to the use of halogen alkylamines, it will be understood, as shown in the illustrative equation, that the hydrohalide as the hydrochloride or hydrobromide are usually employed. As the halogen alkylamines are in most cases isolated as acid salts, they are convenient to use in such form rather than as the free base.

Other examples of halogen alkylamines which may be employed are 2-chloropropylamine, 2- chloro n-butyl amine, 2-phenyl 2-chloroethylamine, 2-chlorocyclohexylamine, etc.

The reaction is preferably carried out in a reactor provided with a reflux condenser, an agitator and a device for cooling the reaction mixture such as a jacket for circulating water.

Two molecular proportions of sodium hydroxide are dissolved in water, one molecular proportion of carbon disulfide is added and the mixture is agitated. A water solution of the 2-halogen alkylamine hydrohalide is slowly added. The mercaptothiazoline begins to precipitate within a few minutes and continues to come down slowly until the addition of the amine is complete. During the reaction there is a rise in temperature and for best results carbon disulfide is allowed to reflux gently, the rate of reflux being maintained by the rate of amine addition. Cooling is only necessary in case the amine addition has been too rapid.

Results equally as satisfactory may be obtained by varying the process so that sodium hydroxide solution is slowly added while stirring a water solution of a 2-halogen alkylamine hydrohalide with carbon disulfide.

The two methods described are the preferred means for controlling the reaction. Lower yields of a less pure product are obtained when carbon disulfide is slowly added to the other two reactants. When carbon disulfide is added slowly, the mercaptothiazoline tends to precipitate as a yellow, sticky, mass rather than as a white, crystalline precipitate obtained by the preferred methods.

The following examples describe the process more specifically, but it will be understood that the invention is not limited to these details:

*Example I*

A. 46.4 g. of 2-chloroethylamine hydrochloride are dissolved in 100 cc. of water in a reaction flask. 33.4 g. of carbon disulfide are added and the mixture is agitated while slowly adding 32 g. of sodium hydroxide dissolved in 50 cc. of water.

About twenty minutes are required for the addition of sodium hydroxide, and during the addition the temperature rises until carbon disulfide gently refluxes. 2-mercaptothiazoline starts to precipitate almost as soon as the addition of sodium hydroxide is begun, and continues until the addition is complete. The reaction mixture is stirred an additional fifteen minutes and the product is then filtered off and dried.

43.7 g. of 2-mercaptothiazoline are obtained, representing a 92% yield. The melting point of the product is 103°-5° C.

The total quantity of water—150 cc. plus about 14 cc. formed in the reaction—is only a slight excess over that required to dissolve the salt formed in the reaction, since the solubility of salt is between 35 and 40 g. per 100 cc. water regardless of temperature. The theoretical quantity of salt formed is about 43 g. which would require about 120 cc. water for solution.

B. The process as described under A is repeated, substituting 54 cc. of 28% aqueous ammonia for sodium hydroxide.

40 g. of 2-mercapto thiazoline are obtained, representing an 84.2% yield. The melting point of the product is 103°-6° C.

*Example II*

32 g. of sodium hydroxide are dissolved in 100 cc. of water in a reaction flask. 33.4 g. of carbon disulfide are added and the mixture is agitated while slowly adding 46.4 g. of 2-chloroethylamine hydrochloride dissolved in 50 cc. of water.

About twenty-five minutes are required for the addition of 2-chloroethylamine hydrochloride. The temperature gradually increases until carbon disulfide refluxes gently. 2-mercaptothiazoline begins to precipitate almost as soon as the addition of 2-chloroethylamine hydrochloride is started, and continues until the addition is complete. The reaction mixture is stirred fifteen minutes longer and the product is then filtered off and dried.

44 g. of 2-mercaptothiazoline are obtained, representing a 92.5% yield. The melting point of the product is 102°-6° C.

My process provides a means whereby mercaptothiazolines of high purity may be prepared in high yields by an easily controlled process, the speed of reaction being regulated as desired. A violent reaction, hazardous and uncertain, resulting from intermixing the reactants all at one time, has been eliminated. My method is readily adapted for use as a continuous manufacturing process as well as a batch process, such continuous process having as advantages purer product, higher yields, greater production from a manufacturing unit, etc.

I claim:

1. A process for preparing 2-mercaptothiazoline by the reaction of 2-chlorethylamine, an alkali and carbon disulfide, which comprises mixing the carbon disulfide with one of the other reagents, agitating and slowly adding the third reagent in the presence of a total quantity of water only slightly greater than that required to dissolve the inorganic salt formed in the reaction, and in the absence of other solvents.

2. A process for preparing 2-mercaptothiazoline by the reaction of one molecular proportion of 2-chlorethylamine hydrochloride with substantially two molecular proportions of an alkali and substantially one molecular proportion of carbon disulfide, which comprises mixing the carbon disulfide with one of the other reagents, agitating and slowly adding the third reagent in the presence of a total quantity of water only slightly greater than that required to dissolve the inorganic salt formed in the reaction and in the absence of other solvents.

3. A process for preparing 2-mercaptothiazoline which comprises slowly adding a 2-chlorethylamine hydrochloride to an agitated mixture of an alkali and carbon disulfide, in the absence of other solvents, in a total quantity of water only slightly greater than that required to dissolve the inorganic salt formed in the reaction.

4. A process for preparing 2-mercaptothiazoline which comprises slowly adding an alkali to an agitated mixture of 2-chloroethylamine and carbon disulfide, in the absence of other solvents, in a total quantity of water only slightly greater than that required to dissolve the inorganic salt formed in the reaction.

5. A process for preparing 2-mercaptothiazoline which comprises slowly adding substantially two molecular proportions of sodium hydroxide to an agitated mixture of substantially one molecular proportion of 2-chloroethylamine hydrochloride and substantially one molecular proportion of carbon disulfide, in the absence of other solvents, in a total quantity of water only slightly greater than that required to dissolve the inorganic salt formed in the reaction.

6. A process for preparing 2-mercaptothiazoline which comprises slowly adding 2-chloroethylamine to an agitated mixture of an alkali and carbon disulfide, in the absence of other solvents, in a total quantity of water only slightly greater than that required to dissolve the inorganic salt formed in the reaction.

7. A process for preparing 2-mercaptothiazoline which comprises slowly adding substantially one molecular proportion of 2-chloroethylamine hydrochloride to an agitated mixture of substantially two molecular proportions of sodium hydroxide and substantially one molecular proportion of carbon disulfide, in the absence of other solvents, in a total quantity of water only slightly greater than that required to dissolve the inorganic salt formed in the reaction.

ROGER A. MATHES.